United States Patent [19]
Yang

[11] Patent Number: 6,104,527
[45] Date of Patent: Aug. 15, 2000

[54] HIGH EFFICIENCY BANDWIDTH DOUBLED AND GAIN FLATTENED SILICA FIBER AMPLIFIER

[75] Inventor: Dan Dan Yang, Gatineau, Canada

[73] Assignee: AFC Technologies Inc., Ottawa, Canada

[21] Appl. No.: 09/026,657

[22] Filed: Feb. 20, 1998

[51] Int. Cl.[7] .................................................. H01S 3/00
[52] U.S. Cl. .................................... 359/341; 359/349
[58] Field of Search ................................ 359/341, 349

[56] References Cited

U.S. PATENT DOCUMENTS

| | | | |
|---|---|---|---|
| 5,392,154 | 2/1995 | Chang et al. | 359/341 |
| 5,790,721 | 8/1998 | Lee | 385/11 |
| 5,801,858 | 9/1998 | Roberts et al. | 359/114 |
| 5,978,130 | 11/1999 | Fee et al. | 359/341 |

*Primary Examiner*—Mark Hellner
*Attorney, Agent, or Firm*—Pascal & Associates

[57] ABSTRACT

A broadband light amplifier comprising a pair of signal transmission and amplification arms, one for carrying a short wavelength signal in a short optical wavelength band and another for carrying a longer wavelength signal in a longer optical wavelength band, an optical amplifier in each arm for amplifying a respective signal carried therein, and a wavelength division optical multiplexer for combining the amplified signals into a single optical fiber, the amplifier being devoid of a circulator.

18 Claims, 5 Drawing Sheets

HIGH EFFICIENCY BANDWIDTH DOUBLED AND GAIN FLATTENED SILICA FIBER AMPLIFIER

FIELD OF THE INVENTION

This invention relates to the field of broadband fiber-based optical amplifiers.

BACKGROUND TO THE INVENTION

Erbium doped fiber amplifiers (EDFAs) are currently the most commonly used optical amplification devices to amplify weak optical signals, weakening of the optical signals being caused for example by attenuation in transmission fibers. EDFAs are largely used in both short and long haul optical communication networks, as well as in CATV broadcast networks. The newest wavelength division multiplexing (WDM) systems require even more use of EDFAs as multiple wavelength light supporting plural channels are carried simultaneously by the same fiber. Thus the amplification gain of the EDFAs must be shared among the different wavelengths of light.

A conventional EDFA has a usable bandwidth of about 35 nm. Assuming a WDM channel spacing of 50 GHz (0.4 nm), this bandwidth would allow up to 80 channels to share the gain of the amplifier used to compensate for losses resulting from signal propagation in the optical fiber. Although the channel spacing can be narrowed to increase the number of transmitted channels, this can complicate signal detection systems (receivers) mainly due to channel crosstalk. It also makes manufacturing of WDM passive components such as dense wavelength division multiplexers/demultiplexers difficult. Very narrow channel spacing causes nonlinear effects such as four photon mixing in the transmitting fiber, which degrades system performance.

It is known that conventional EDFAs could amplify longer wavelength light such as around 1585 nm through use of a long Erbium doped fiber and by employing 1530 nm pumping. However, the efficiency is very low due to the required two-step pumping process (980 to 1530 nm, than 1530 to 1585 nm). To obtain a reasonable amplification gain, large amounts of pump power, such as is obtained by using a MOPA (Master Oscillator Power Amplifier) laser, or a combination of 4 or more 980 nm and/or 1480 nm pump lasers, has to be used. It has been reported that a 20 dB gain can be obtained using a total of 500 mW pump power, with a difference of gain of more than 10 dB between the two amplification bands (1545 nm and 1585 nm). Circulators together with reflective gratings were used to combine shorter and longer wavelength bands. These configurations either require expensive and short lifetime components, or by using many active pump lasers, systems require complex electronic surveillance circuitry and have the potential of a high failure rate.

SUMMARY OF THE INVENTION

In accordance with an embodiment of the present invention, a fiber amplifier using an erbium doped fiber as an amplification medium is pumped with a 980 or a 1480 nm pump laser, and can provide amplification over a 75 nm bandwidth of a multiple wavelength input optical signal. In a successful laboratory prototype, only a total of 200 mW pump power, and a maximum of two pump lasers operating at 980 or 1480 nm was required to provide 20 dB inline amplification gain over this bandwidth. It should be noted that the 75 nm amplified bandwidth is about twice that provided by a conventional EDFA. No circulator was required. Instead only a broadband pass filter was required, configured to be an add/drop multiplexer/demultiplexer. The gain was substantially flat in each of two windows, with a difference of less than 1 dB between 1545 nm and 1585 nm.

A preferred embodiment of the present invention utilizes two sub-amplifiers, with ¼ of the total pump power used to amplify signals in a first band sub-amplifier between 1530 to 1560 nm. The remaining ¾ of the pumping power is used to amplify signals between 1560 to 1620 nm, in a second band sub-amplifier.

Two fiber gratings are employed, one to flatten the nominal 1545 nm first sub-amplifier gain peak at 1530 nm, and a second one to boost the 1530 nm signal which is used as pump light for generating gain in the nominal 1585 nm window in the second sub-amplifier.

The use of a bandpass filter-based add/drop multiplexer/demultiplexer to combine or separate signals from the two amplification bands does not introduce a large insertion loss as would be introduced if circulators or other coupling devices were used. Thus the combination and separation of signals from different sub-amplifiers is provided with minimum loss and conservation of high gain obtained in the sub-amplifiers.

It has been demonstrated that the present invention can provide more than 25 dB gain of a small signal, or 20 dB inline gain for the WDM case. Combined saturation power in this case was greater than 13 dBm, which represents an absolute pump efficiency of more than 10%.

In accordance with an embodiment of the invention, a broadband light amplifier comprises a pair of signal transmission and amplification arms, one for carrying a short wavelength signal in a short optical wavelength band and another for carrying a longer wavelength signal in a longer optical wavelength band which is adjacent the short optical wavelength band, an amplifier in each arm for amplifying a respective signal carried therein, and a wavelength division optical multiplexer for combining the amplified signals into a single optical fiber, the amplifier being devoid of a circulator.

BRIEF DESCRIPTION OF THE DRAWINGS

A better understanding of the invention will be obtained by a consideration of the detailed description below, in conjunction with the following drawings, in which.

DETAILED DESCRIPTION OF EMBODIMENT OF THE PRESENT INVENTION

Figure 1:
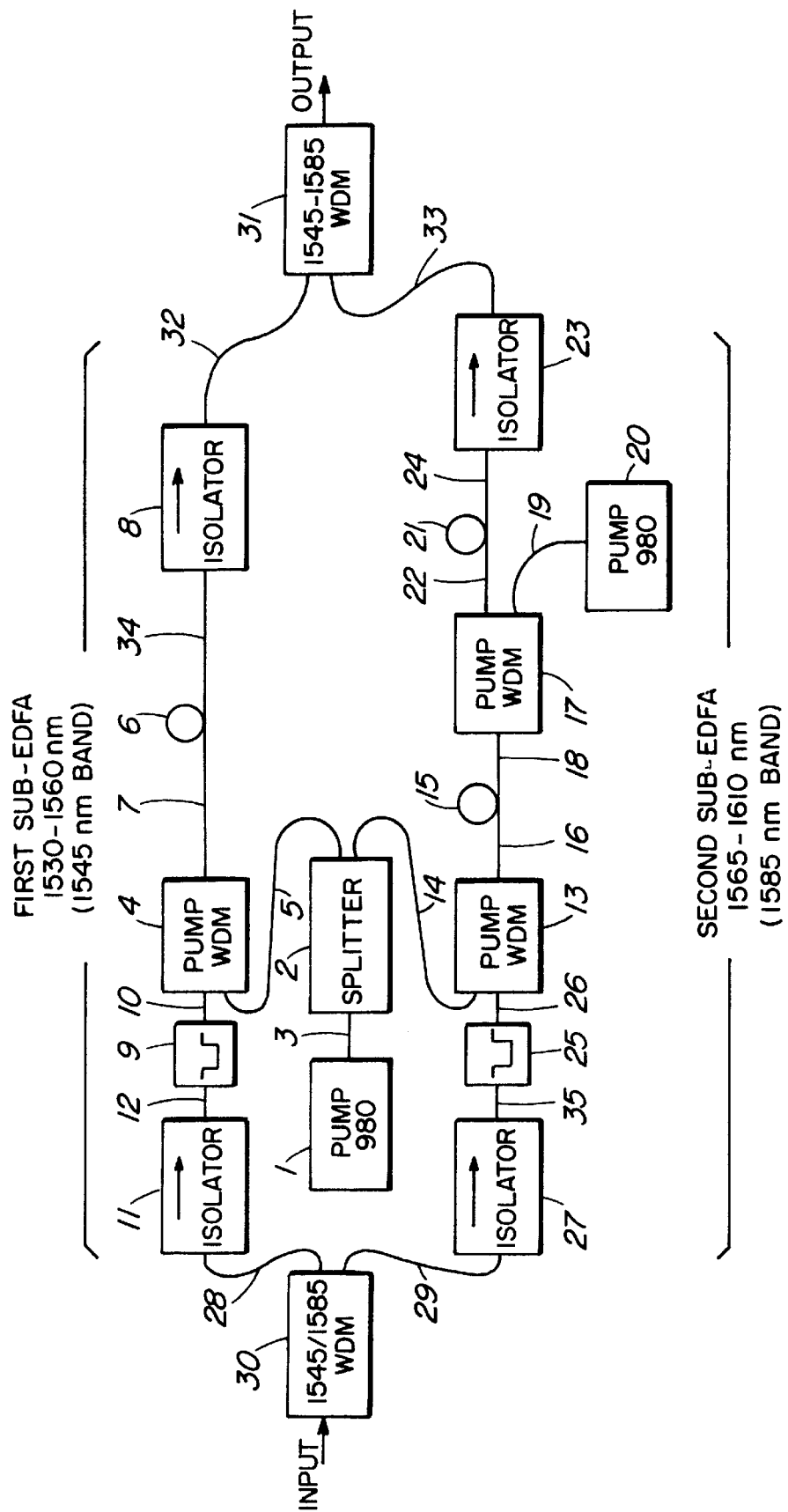
FIG. 1 is a schematic of a preferred embodiment of the invention.

As may be seen in FIG. 1, two separate generally parallel amplifier arms are provided, each of which uses Erbium doped fibers. One provides a gain flattened 1545 nm band EDFA, and the other provides a gain flatted 1585 nm band EDFA. Signals to be amplified by each of the arms are separated via a bandpass filter-based wavelength demultiplexer at the input of the arms, and the amplified signals are combined via a multiplexer at the output of the arms.

The output of a first pump laser 1 is fusion spliced to the input of a pump wavelength splitter 2, at point 3. In a successful embodiment, the splitter splitting ratio was 50%—50%. In the laboratory prototype, each of the two outputs of the splitter can carry about 50 mW of 980 nm laser power. The splitting ratio can be other thatn 50%, depending on the total available pumping power at 980 nm, and the degree of balance the designer would like to achieve between the gains provided by the two sub-amplifiers.

One of the outputs of splitter 2 is fusion spliced at point 5 with the 980 nm light input arm of a pump WDM 4 which pump WDM is commonly used in EDFAs to multiplex pump wavelength at 980 nm and a signal wavelength (which signal is passed from an input via the arm sub-amplifier) at 1550 nm.

Figure 3:
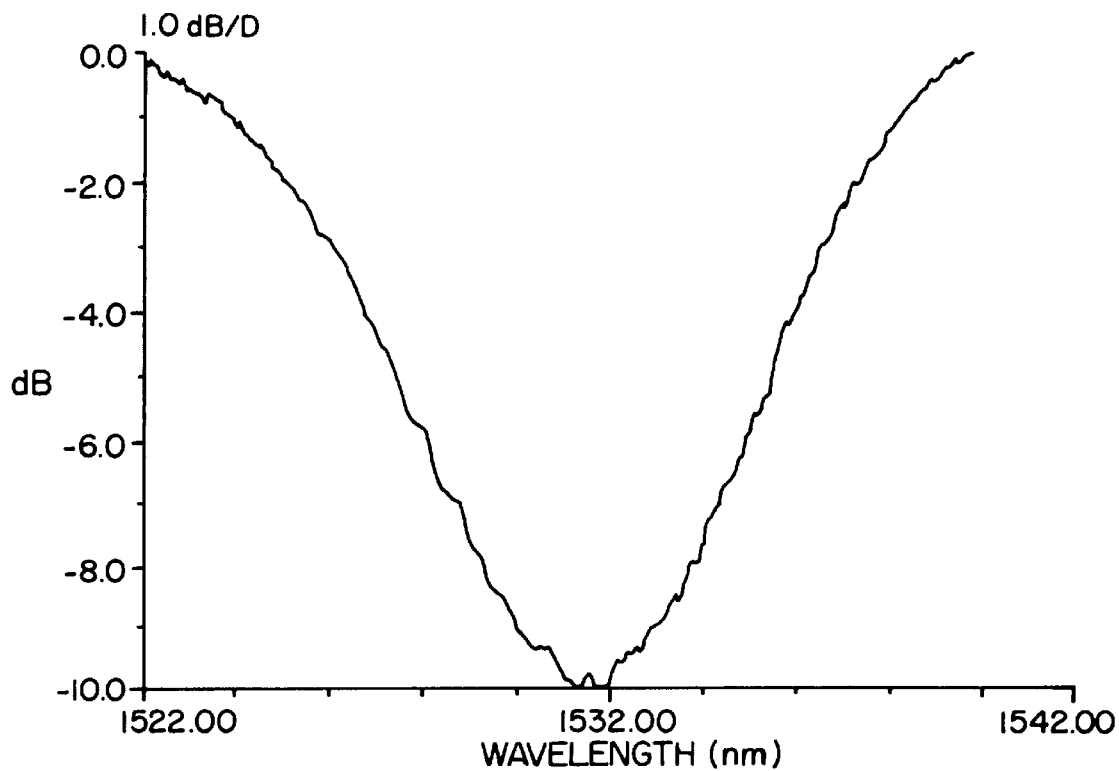
FIG. 3 is a graph of the transfer function of a gain flattening filter used as an element of the preferred embodiment.

The 1550 nm signal input arm of the pump WDM 4 is fusion spliced at point 10 with a gain flattening filter, which can be a Bragg grating 9. Bragg grating 9 should have a transfer function which negatively corresponds to the gain peak of the EDFA which will be described below, as shown in FIG. 3.

The Bragg grating 9 is combined in series with an optical isolator 11 which is spliced to it at point 12, and allows an attenuation of the gain peak of the EDFA in order to flatten the gain of the arm.

The output of the pump WDM 4 carries both 980 nm pump light and the 1550 nm signal light, it is fusion spliced at point 7 with a length of Erbium doped amplifying fiber 6. The length of this fiber can vary, depending on the doping concentration, but in the laboratory prototype it was optimized to have a length of 8 meters for 50 mW of pump power.

The other end of this doped fiber is fusion spliced to an isoloator 8 at point 9. The role of the isolator is to damp multiple reflections coming from output which, if without the isolator, would get into Erbium fiber and cause specification in the Erbium doped fiber 6, of the reflections. Isolator 8 can be either single or double stage.

Figure 5A:
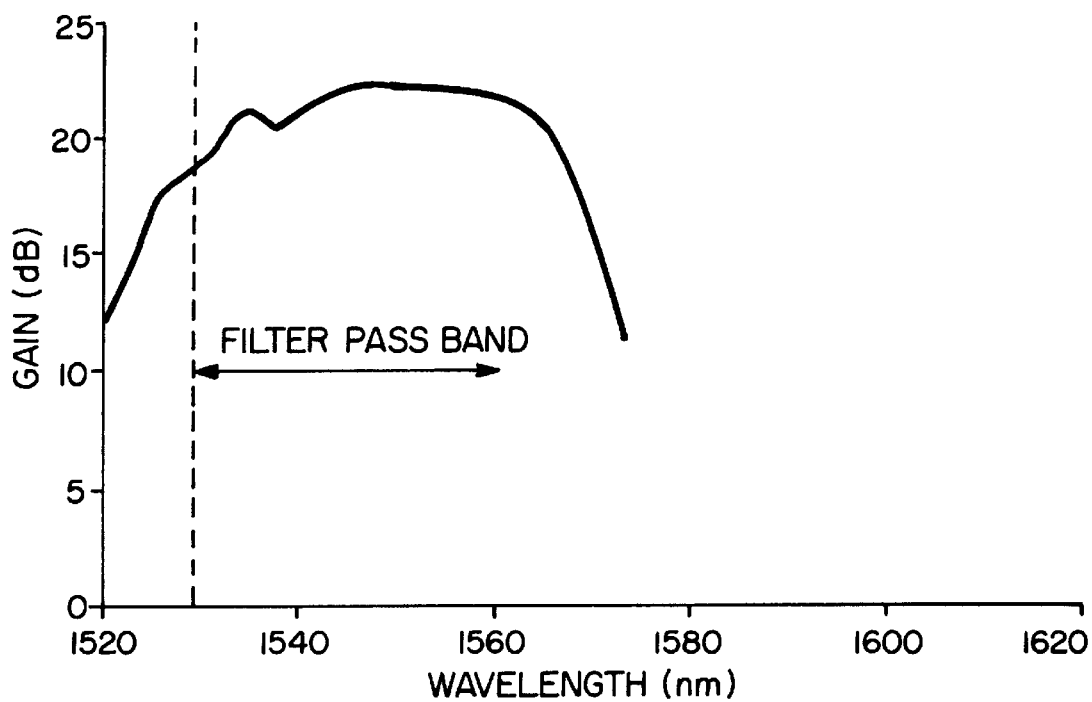
FIG. 5A is a graph of the gain function of the first sub-amplifier, before multiplexing/demultiplexing.

The above-described sub-amplifier provides gain from about 1520 nm to 1570 nm, as shown in FIG. 5A.

While a single pumping stage has been described to keep the structure simple, two or more pumping stages can be used to achieve a better noise figure and/or higher gain. Other techniques than described to flatten the gain can be used, such as inserting a gain flattening filter between multiple pumping stages or at the output of the amplifier.

In the second arm, the second sub-amplifier is formed in two sections.

The first section contains a 1530 nm signal generator which is used as a pump source for the amplifier of the 1585 nm band. Optimization of the first section can control the final gain that can be achieved for the 1585 nm band signal.

The second output port of splitter 2, also carrying 50% of the 980 pump power in the prototype described herein, is spliced to the input port of a 980 nm pump WDM 13 at point 14. The output port of pump WDM 13, which carries both pump and input signal wavelength light, is spliced with an amplifying Erbium doped fiber 15 at point 16. The other end of the Erbium doped fiber 15 is fusion connected to another pump WDM 17, via a 1550 nm input port, at junction 18.

The pump WDM 17 also has a 980 nm input port fusion spliced with a second pump laser 20 output at point 19, from which it receives 980 nm light.

The length of the Erbium doped fiber 15 should be optimized to accept 980 nm pump light from both pump lasers 1 and 20. In the prototype, the length of fiber 15 was approximately 15 meters.

Thus, pump power from pump 1 pumps fiber 15 in the forward direction, and higher pump power from pump laser 20 reversely pumps the doped fiber 15 in order to generate more efficiently amplified spontaneous emission (ASE) in the forward signal transmission direction. This section then pumps the second section to generate gain in the 1585 nm band.

Figure 4:
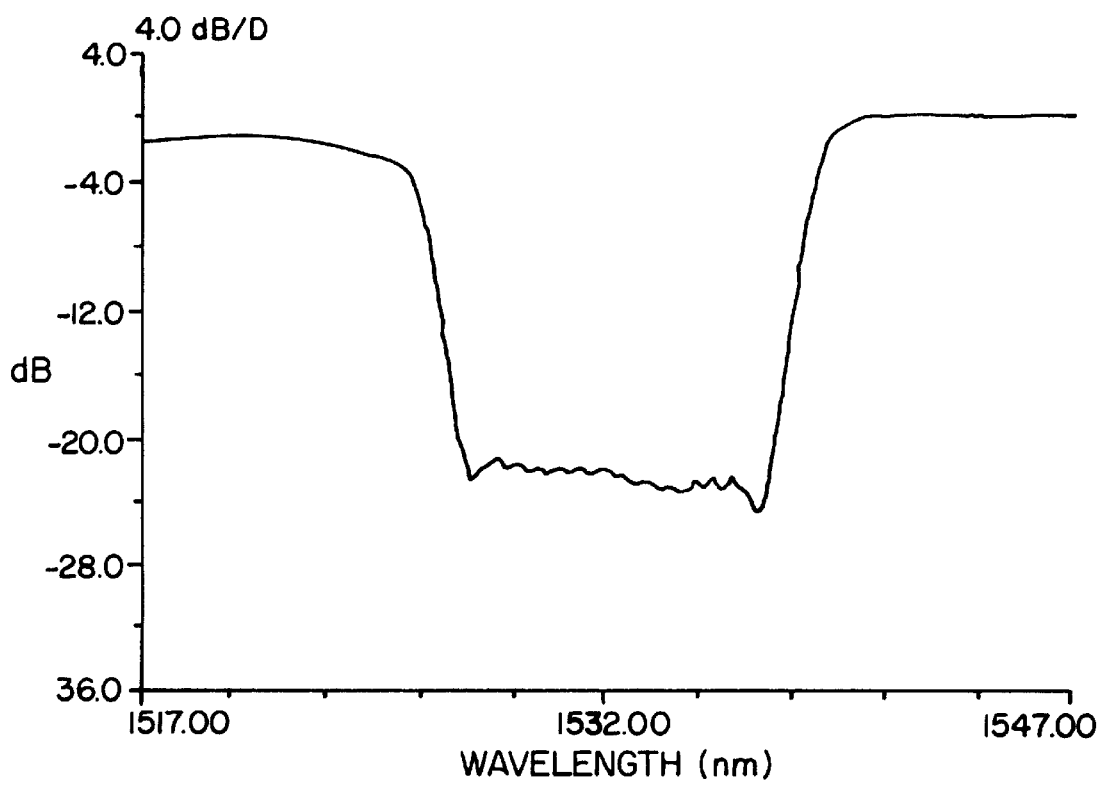
FIG. 4 is a graph of the transfer function of a reflective grating used as an element of the preferred embodiment.

Since ASE is always generated in both forward and backward propagating directions, a reflective filter 25 (such as a reflective Bragg grating) is inserted at the second sub-amplifier input by fusion at point 26. This filter reflects light of wavelength below 1560 nm and transmits with quasi-zero insertion loss the light of wavelength above 1560 nm. This reflector filter can be comprised of a Bragg grating with a profile which negatively corresponds to the EDFA ASE peak profile (see its transfer function of the prototype in FIG. 4).

Since most of the backward transmitted ASE is reflected back to the Erbium fiber 15, this stage operates highly saturated, and thus emits efficiently high power ASE in the 1545 nm band, mainly centered in the peak of 1530 nm. In the prototype, the power level was about 50 mW.

To avoid multiple reflections, it is preferred to insert an isolator 27 at the input by fusion with reflective filter 25, at point 28. The input signal in this longer wavelength band is applied to the input of isolator 27.

The 1550 nm output arm of pump WDM 17 carries about 50 mW of ASE power generated by the Erbium fiber 15, from a total of 150 mW pump power (50 mW from pump 1 and 100 mW from pump 20), and is applied to the longer Erbium doped fiber 21, fusion connected at point 22. The total doped fiber length depends on the absorption coefficient, but in the prototpye was preferably about 5 to 10 times the length of Erbium fibers used in a conventional EDFAs. The length of fiber 21 was optimized to be about 80 meters in order to provide a flat gain over the entire 1585 nm bandwidth. The 1530 nm ASE generated in the first section is absorbed in fiber 21 to amplify signals having a longer wavelength than 1560 nm (the 1585 nm band).

The other end of fiber 21 is fusion connected to an isolator 23 at point 24. Isolator 23 can be a single stage standard isolator centered at 1585 nm, or a double stage standard 1550 nm isolator.

Figure 5B:
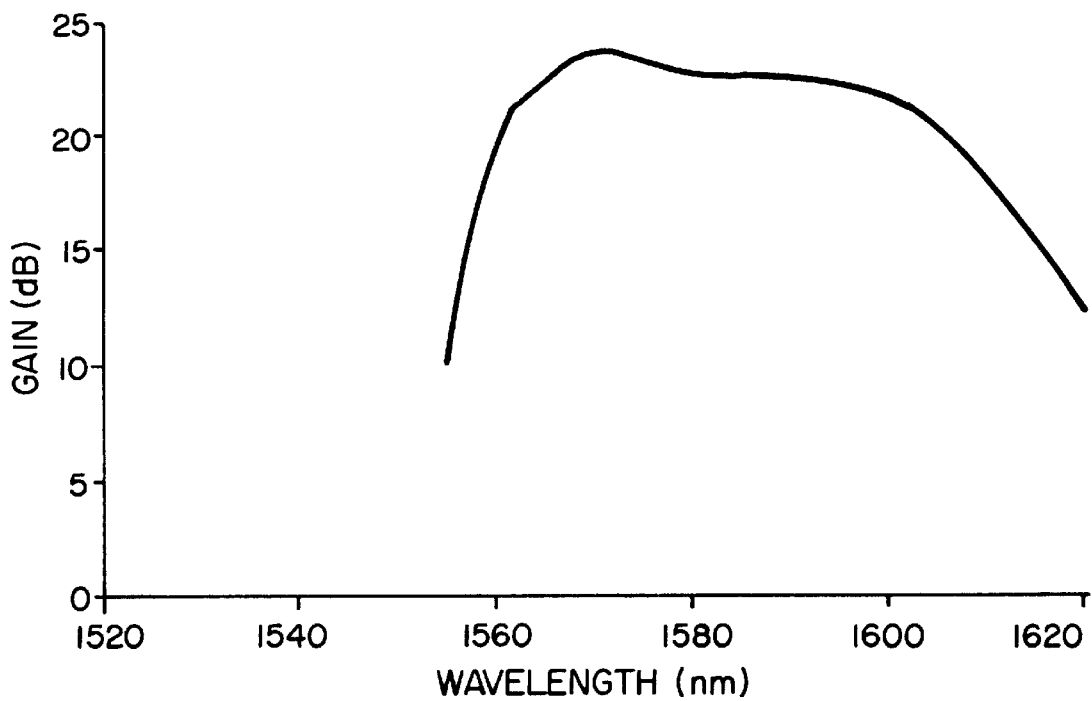
FIG. 5B is a graph of the gain function of the second sub-amplifier, before multiplexing/ demultiplexing.

The gain profile of this 1585 nm band sub-amplifier is shown in FIG. 5B.

Figure 2:
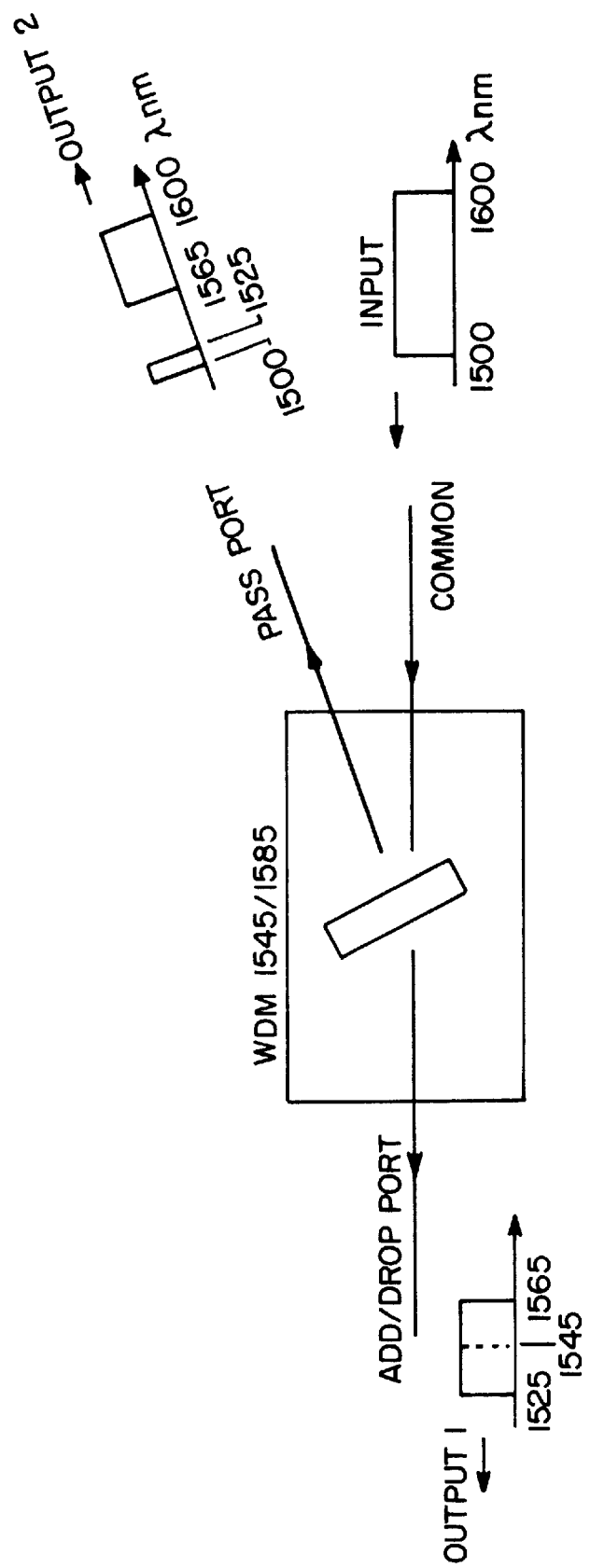
FIG. 2 is a block diagram of a preferred form of wavelength division multiplexer.

Two bandpass filter based wavelength division multiplexers/demultiplexers (WDM) 30 and 31 are used to couple the two arms respectively to an input and to an output. With reference to both FIGS. 1 and 2, the WDM 30 common port is the input port of the broadband amplifier. An add/drop port is the regular bandpass filter input port, is fusion spliced with the first sub-amplifier input at point 28. A WDM 30 pass port is splice connected with the second sub-amplifier input at point 29.

The pass port does not exist in a regular bandpass filter. To be able to use it as a multiplexer/demultiplexer, the pass port is added to collect the out-of-band light rejected by the bandpass filter. When the signal coming from the common port contains signals in both 1545 nm and 1585 nm bands, the signal in the 1545 nm band passes through the filter to the add/drop port and is directed to the first sub-amplifier, and is amplified. The signal in the 1585 nm band, rejected by the filter, is collected by the pass port and is directed to the second sub-amplifier and is amplified. The pass port and the common port are optically symmetrical between incident and reflected light.

After being separately amplified in the respective sub-amplifiers, the amplified signal in the 1545 band passes to the add/drop port of WDM 31, which is fusion connected to isolator 8 at point 32. The signal passes through the WDM 31 and is directed to the common port of WDM 31 for outputting.

The pass port of WDM 31 is fusion connected to the output of isolator 23 at point 33. The amplified signal in the 1585 nm band passes into the pass port of WDM 31, and is rejected by the filter and is collected by the common port due to the symmetry of the device.

As a result, the common port of WDM 31 outputs light containing amplified signals in both the 1545 nm and 1585 nm bands.

Figure 6:
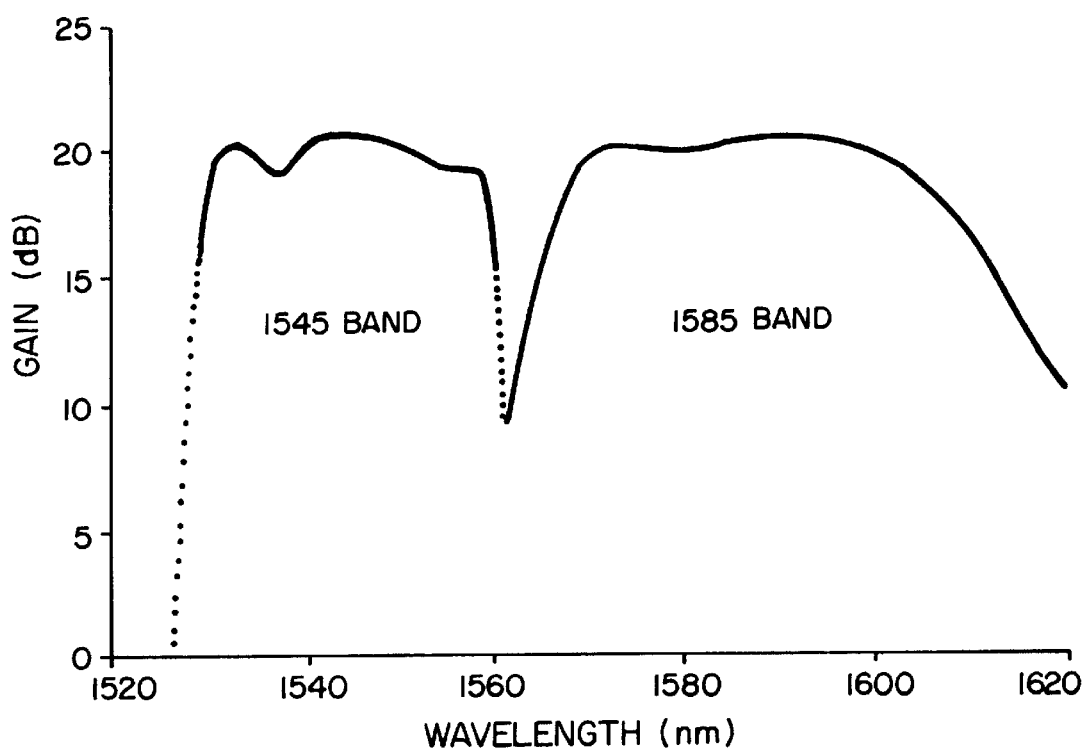
FIG. 6 is a graph of the final gain function of the broadband amplifier in accordance with an embodiment of the present invention.

The combined gain curve of the prototype amplifier may be seen in FIG. 6. The dip in the middle of the gain curve is due to the transition between reflection and transmission of the bandpass filter based 1545/1585 nm WDM. The position of the dip can be shifted toward shorter or longer wavelengths, depending on the bandwidth chosen of the filter. If only one 1545/1585 nm WDM were used, e.g. at the output and not at the input (separate bandwidth signals being separated with a 50/50 coupler then applied to the inputs of the respective isolators 11 and 27), the dip depth can be decreased by half. If a 50/50 coupler is also used in place of WDM 31 the dip can be completely eliminated, but each coupler would introduce a 3 dB loss.

It may be seen from the above description that besides the novel input and output WDMs 30 and 31, only conventional fiber optic components have been used, rather than expensive circulators, MOPA lasers, or a 1530 nm high power DBF laser. In the prototype, the total saturation power, with 0 dBm total input power, was greater than 13 dBm, which represents an absolute 980 nm pump efficiency higher than 10%. The amplification gain curve was flat in the multiple wavelength WDM input situation, with gain approximately 20 dB for each channel. Thus for example, if 100 channels were distributed uniformly over two amplification bands, each channel input power being −25 dBm, the output of the amplifier will deliver a signal level of −5 dBm per channel. This 20 dB gain represents an extra 100 kilometer transmission distance for a wavelength division multiplexing system of up to 160 channels.

The structure used in this invention is also efficient to provide double bandwidth amplified spontaneous emission ASE, which has applications such as for component characterization, for fiber sensor networks, etc.

To enhance the total output power, the input WDM 30, isolators 11 and 27 and gratings 9 and 25 can be eliminated and replaced by a reflector in each arm which reflects backward ASE back to the sub-amplifiers in order to output high density ASE power. The prototype has delivered more than 25 mW of ASE power over the whole broad (double) bandwidth.

A person understanding this invention may now conceive of alternate embodiments and enhancements using the principles described herein. All such embodiments and enhancements are considered to be within the spirit and scope of this invention as defined in the claims appended hereto.

I claim:

1. A broadband light amplifier comprising a pair of parallel signal transmission and amplification arms, a first arm for carrying a short optical wavelength signal in an optical wavelength band and a second arm for carrying a longer wavelength signal in said wavelength band, an optical amplifier in each arm for amplifying a respective signal carried therein, and a wavelength division multiplexer for combining the amplified signals into a single optical fiber, the light amplifier being devoid of a circulator, and the optical amplifier in each arm being similarly doped.

2. An amplifier as defined in claim 1 comprising, in the first arm, a first optical signal generator for receiving and amplifying a signal in the short optical wavelength band, and in the second arm a second optical signal generator for receiving and amplifying a signal in the longer optical wavelength band, and a third optical signal generator for generating a pump signal in the short optical wavelength band and for applying it as a pump source to the second optical signal generator whereby the second optical signal generator is enabled to receive and amplify a signal in the longer wavelength band.

3. An amplifier as defined in claim 2 including a reflective filter coupled in series with the second optical signal generator for reflecting back into the second optical signal generator, backward emitted ASE light.

4. An amplifier as defined in claim 3 in which the third optical signal generator is comprised of an Erbium doped amplification fiber pumped from a light output transmission direction side by one light pump, and pumped from the other side by another light pump, the wavelengths of pumping light from both one and another pumps being both the same or respectively of 980 nm and 1480 nm, whereby ASE is generated in the Erbium doped amplification fiber in the light output transmission direction.

5. An amplifier as defined in claim 4 in which power of light pumped by the one light pump is greater than power of light pumped by the other light pump, whereby gain is generated in the light output transmission direction in the longer light wavelength band.

6. An amplifier as defined in claim 5 including a reflective filter coupled in series with the first optical signal generator for reflecting back into the first optical signal generator backward emitted ASE light substantially that in an amplification peak band of the first optical signal generator so as to reduce the amplification of the first optical signal generator in said amplification peak band.

7. An amplifier as defined in claim 6 including isolators coupling said respective amplification arms into the combining wavelength division optical multiplexer, the isolator in the first arm having a passband over the shorter optical wavelength band and the isolator in the second arm having a passband over the longer optical wavelength band.

8. An amplifier as defined in claim 7, in which the first and second optical signal generators are each comprised of an Erbium doped amplification fiber.

9. An amplifier as defined in claim 8, including an input wavelength division multiplexer for receiving an input signal and for delivering said short wavelength signal to the first arm and said longer wavelength signal to the other arm.

10. An amplifier as defined in claim 8, including an input wavelength division multiplexer for receiving an input signal and for delivering said short wavelength signal to the first arm and said longer wavelength signal to the other arm.

11. An amplifier as defined in claim 1 comprising a first optical pump having an output coupled to the input of an optical splitter, a first and a second pump wavelength division multiplexer in respective arms, each for receiving respective portions of an output light from the optical splitter at one port and the respective input signals at a second port and for outputting at a third port first multiplexed signals, a first Erbium doped amplification fiber coupled to the output of the first pump wavelength division multiplexer for amplifying light in the short optical wavelength band, a second Erbium doped amplification fiber coupled to the output of the second pump wavelength division multiplexer for forming with the output light of the second pump wavelength division multiplexer a pump source for amplification in the longer wavelength band, a third pump wavelength division multiplexer having an input port coupled to the second Erbium doped amplification fiber, a second optical pump having an output coupled to another input port of the third pump wavelength division multiplexer, the length of the second doped amplification fiber being optimized for accepting pump light from both first and second optical pumps, a reflective filter coupled in series with the second pump wavelength division multiplexer for reflecting back into the second Erbium doped amplification fiber, backward emitted amplified spontaneous emission (ASE) light in the shorter wavelength band, a third Erbium doped amplification fiber coupled to an output port of the third pump wavelength division multiplexer which has length that is optimized to provide approximately flat gain over the longer optical wavelength band, first and second isolators coupled to the respective outputs of the first and third Erbium doped amplification fibers, and an output wavelength division multiplexer having inputs coupled to respective outputs of the isolators and an output for providing a combined amplified short and long wavelength band output signal.

12. An amplifier as defined in claim 11, including a reflective filter coupled in series with the first pump wavelength division multiplexer for reflecting back into the Erbium doped amplification fiber backward emitted ASE light in the short wavelength over a band substantially that which coincides with an amplification peak of the first pump wave division multiplexer so as to reduce the amplification of the first Erbium doped amplification fiber amplification peak band.

13. An amplifier as defined in claim 11, in which each of the pumps emits light at about 980 nm, in which the short optical wavelength band is approximately 1530 nm to 1560 nm, and in which the longer optical wvelength band is approximately 1565 nm to 1620 nm.

14. An amplifier as defined in claim 11 in which the reflecting filters are comprised of Bragg gratings.

15. An amplifier as defined in claim 10 in which the input wavelength division multiplex is comprised of an optical bandpass filter for passing an optical signal in a passband to an add or drop port, and a pass port for collecting light outside the passband, the first and second arms being respectively coupled to the add or drop port and to the pass port.

16. An amplifier as defined in claim 3, including an input demultiplexer for coupling the shorter and longer wavelength optical signals into the respective amplification arms.

17. An amplifier as defined in claim 12, including an input wavelength division multiplexer for receiving an input signal and for delivering said short wavelength signal to the first arm and said longer wavelength signal to the other arm.

18. An amplifier as defined in claim 1, including an input demultiplexer for coupling the short and longer wavelength optical signals into the respective amplification arms.

\* \* \* \* \*